United States Patent Office 3,309,205
Patented Mar. 14, 1967

3,309,205
FOOD PRODUCTS AND PROCESS FOR ENHANCING FLAVOR OF FOOD WITH N,N'-DI-o-TOLYLETHYLENEDIAMINE
Richard L. Hughes, West Roxbury, Theodore E. Dickelman, Arlington, David A. Kendall, West Newton, and Douglas E. Melzard, Georgetown, Mass, assignors to Arthur D. Little, Inc., Cambridge, Mass., a corporation of Massachusetts
No Drawing. Filed Dec. 23, 1964, Ser. No. 420,799
2 Claims. (Cl. 99—140)

This invention relates to a food product and a process for enhancing the flavor of food and more particularly to such a product and process involving N,N-di-o-tolylethylenediamine.

It is a general object of the present invention to provide both a food product having enhanced flavor and a process for enhancing the flavor of food by the use of N,N'-di-o-tolylethylenediamine.

Other and further objects will be apparent from the following description of the invention.

This invention is based upon the discovery that if there is intimately blended with food N,N'-di-o-tolylethylenediamine in an amount between about $5 \times 10^{-16}$ and $1 \times 10^{-8}$ parts by weight of the food that the food has its flavor enhanced. The exact mechanics of the enhancement of flavor of the food are not known. The in-the-mouth effects are such that the N,N'-di-o-tolylethylenediamine when used in the amounts set forth above, does not have a noticeable flavor of its own. Instead, with various foods, it masks certain unpleasant flavors and in others allows desirable flavors to be more noticeable. Additionally, flavors are blended to form a more favorable flavor complex.

At concentrations of less than $5 \times 10^{-16}$ parts there is no noticeable enhancement of flavor. At concentrations above approximately $1 \times 10^{-8}$ parts the N,N'-di-o-tolylethylenediamine's own flavor becomes noticeable.

N,N'-di-o-tolylethylenediamine is a compound which has been known to chemists for some time and can be purchased commercially. Additionally, a method of preparation of it is given in an article by William S. Mills, Journal of the Chemical Society, 1900, 77, 1021, and so no further description of N,N'-di-o-tolylethylenediamine is necessary.

The best mode contemplated of carrying out the invention is to dissolve the N,N'-di-o-tolylethylenediamine in an edible substance in which it is soluble and then blend the solution of N,N'-di-o-tolylethylenediamine and the edible product with food in the concentrtaion desired. The edible substance in which the N,N'-di-o-tolylethylenediamine is dissolved may be a sample of the food to which the solution is added.

Set forth below are examples of the food product and process of the present invention.

EXAMPLE 1

A margarine was made having the following formula:

| Constituents: | Percentages |
|---|---|
| Base fat (80% unhydrogenated soybean oil, 5% cottonseed oil hydrogenated to an I.V. of 64.1, and 15% cottonseed oil hydrogenated to an I.V. of 52.6 containing $1 \times 10^{-9}$ parts of N,N'-di-o-tolylethylenediamine per part of final product) | 80.00 |
| Lecithin | 0.20 |
| Sodium benzoate | 0.10 |
| Salt | 2.25 |
| Milk | 17.45 |
| | 100.00 |

In making this margarine the crystalline N,N'-di-o-tolylethylenediamine was mixed with a small sample of the base fat in the ratio of 10 mg. of N,N'-di-o-tolylethylenediamine per kg. of base fat. This mixture was heated to between 65° and 75° C., the melting point of the crystals, during mixing to thoroughly disperse the crystals within the fat. This mixture of N,N'-di-o-tolylethylenediamine and base fat was added to the remainder of the base fat in an amount equal to 0.0125% by weight of the base fat which yields approximately 1 part per billion of N,N'-di-o-tolylethylenediamine in the finished product. The milk was placed in the mixing tank, the salt and sodium benzoate added to the milk, and the contents of the tank mixed until the salt and sodium benzoate were dissolved. The lecithin and small amount of flavoring, coloring, and Vitamin A were added to and mixed with the base fat. This base fat mixture was then added to the mixing tank which contained the milk, salt, and sodium benzoate. The contents of the tank were then thoroughly mixed, passed through a shortening votator, and then passed to a votator chilling unit. The product removed from the votator chilling unit was the finished margarine.

The finished margarine had a more butter-like flavor than margarine made without the N,N'-di-o-tolylethylenediamine and there was a noticeable suppression of diacetyl and butyric aromatics and hydrogenated vegetable oil taste.

EXAMPLE 2

N,N'-di-o-tolylethylenediamine crystals were dissolved in ethanol of food grade quality and this solution added to sufficient reconstituted non-fat dry milk to yield a concentration of about $1 \times 10^{-15}$ parts of N,N'-di-o-tolylethylenediamine. This reconstituted dry milk had a noticeable elimination of cowy and barny aromatics and resulted in a more milky aftertaste than the chalky dryness commonly found in reconstituted dry milk.

N,N'-di-o-tolylethylenediamine crystals are soluble in oils and so may be added directly to the oils used in fat base products such as margarines and shortenings. N,N'-di-o-tolylethylenediamine has low solubility in water but it may be added to foods packed in aqueous solutions such as canned vegetables by dissolving the crystals of N,N'-di-o-tolylethylenediamine in ethanol, in which it is soluble, and adding this ethanol solution to canned vegetables in amounts of between about $5 \times 10^{-16}$ and $1 \times 10^{-8}$ parts by weight of such foods. In short, the N,N'-di-o-tolylethylenediamine may be dissolved in any material that is not objectionable to the food and such material blended with the food in amounts between about $5 \times 10^{-16}$ and $1 \times 10^{-8}$ parts by weight of the food.

From the foregoing discussions, examples and description of the invention, it is apparent that the objects set forth herein as well as others have been attained. Those skilled in the art will recognize that the principle of this invention may be applied in several ways, only a few of which have been exemplified specifically herein. Accordingly, the invention is to be limited only by the spirit thereof and the scope of the appended claims.

What is claimed is:
1. A process for enhancing the flavor of food comprising blending betweeen about $5 \times 10^{-16}$ and $1 \times 10^{-8}$ parts of N,N'-di-o-tolylethylenediamine with one part of food.
2. A food product comprising a blend of one part of food and between about $5 \times 10^{-16}$ and $1 \times 10^{-8}$ parts of N,N'-di-o-tolylethylenediamine.

No references cited.

A. LOUIS MONACELL, *Primary Examiner.*
H. H. KLARE, *Assistant Examiner.*